United States Patent [19]

McGrew

[11] 4,083,778
[45] Apr. 11, 1978

[54] METHOD FOR COALESCING

[75] Inventor: Jay L. McGrew, Littleton, Colo.

[73] Assignee: Marine Construction & Design Co., Seattle, Wash.

[21] Appl. No.: 766,027

[22] Filed: Feb. 7, 1977

Related U.S. Application Data

[63] Continuation of Ser. No. 566,926, Apr. 10, 1975, abandoned.

[51] Int. Cl.² .............................................. B01D 15/02
[52] U.S. Cl. ................... 210/23 R; 210/30 A; 210/40; 210/DIG. 5; 210/DIG. 26
[58] Field of Search ............... 210/23 R, 30 A, 40, 210/350, 400, 401, 402, DIG. 5, DIG. 26

[56] References Cited

U.S. PATENT DOCUMENTS

| | | | |
|---|---|---|---|
| 2,881,127 | 4/1959 | Hetzel | 210/30 A |
| 3,578,585 | 5/1971 | Yahnke | 210/30 A |
| 3,617,552 | 11/1971 | Will | 210/30 A |
| 3,779,908 | 12/1973 | Gregory | 210/23 R |
| 3,992,292 | 11/1976 | Grimes et al. | 210/DIG. 26 |

Primary Examiner—Charles N. Hart
Assistant Examiner—Ivars Cintins
Attorney, Agent, or Firm—Christensen, O'Connor, Johnson & Kindness

[57] ABSTRACT

A method and apparatus to effect coalescence of a first liquid suspended as minute droplets in a second liquid of different specific gravity. An endless small-pore matrix having internal pore surfaces preferentially attractive to the first liquid, and having ingested a quantity of the mixture liquids is advanced through a transport interval to a point of discharge with quiescent conditions maintained within the pores for a sufficient time to permit gravitational settling and resultant coalescence of the droplets on the pore surfaces. Squeezing the resiliently compressible matrix at the end of such transport or pumping interval purges the second liquid and coalesced first liquid from the pores, and subsequent reexpansion of the matrix as it reenters the mixture causes ingestion of additional mixture to be processed, the process being repeated on a continuing cyclical basis.

10 Claims, 5 Drawing Figures

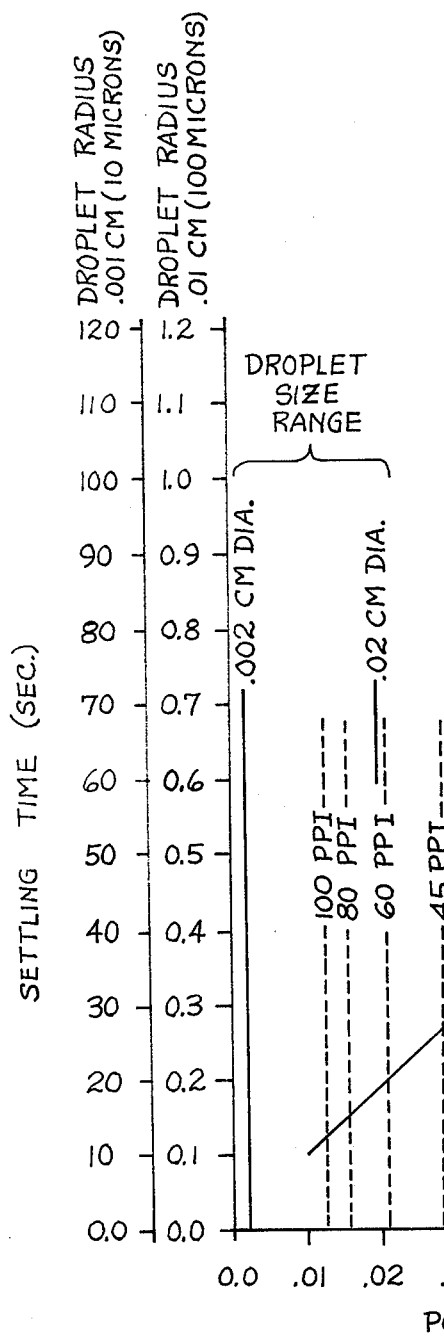
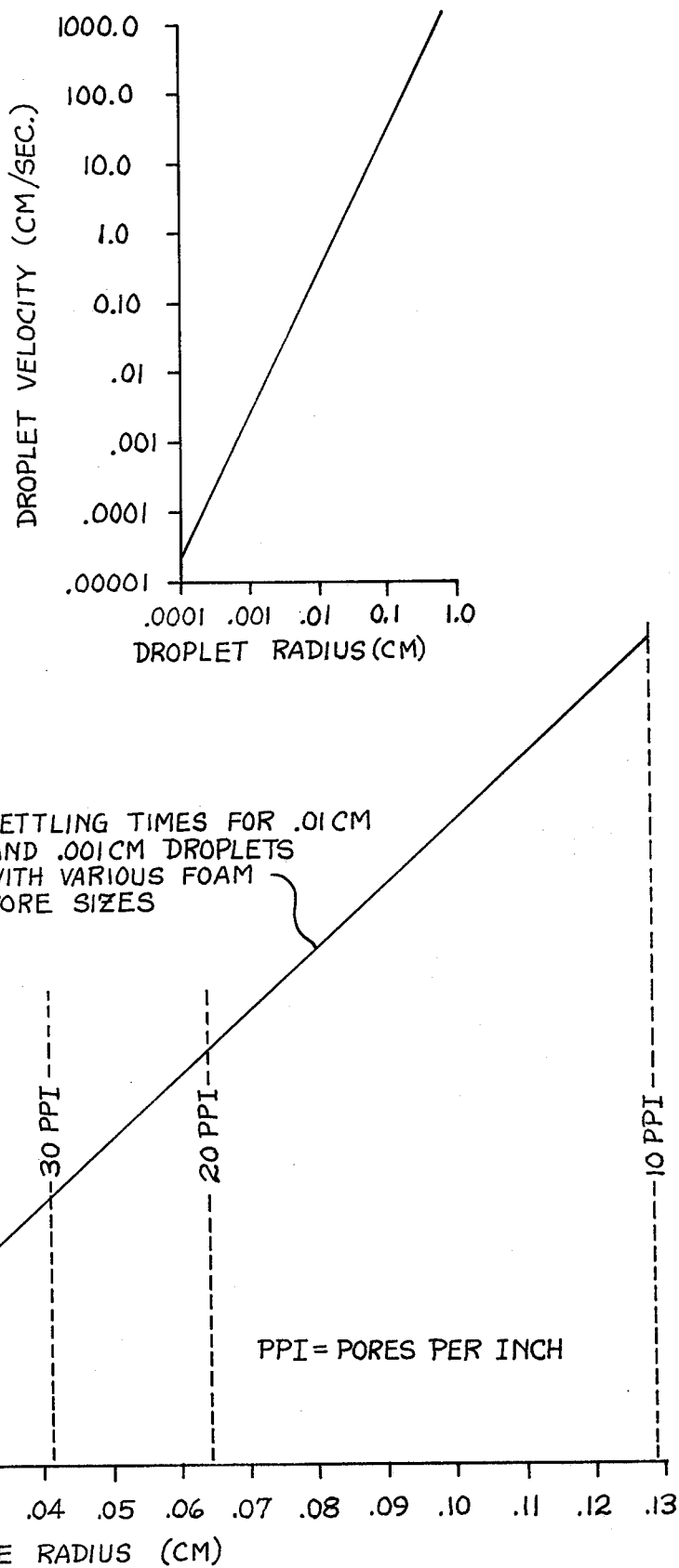

METHOD FOR COALESCING

This is a continuation, of application Ser. No. 566,926, filed Apr. 10, 1975, now abandoned.

BACKGROUND OF THE INVENTION

This invention relates to separation of the components of immiscible liquid mixtures, such as oil and water, wherein one of the liquids (the oil) is finely dispersed in the other liquid. More particularly, the present invention is directed to improved processes and apparatus making novel use of the combined effects of specific gravity differences of the immiscible liquids, substantially static conditions maintained with the pores of a mixture holding and transport matrix, and the "catalytic" effect of the pore surfaces selectively attractive to the liquid to be coalesced. The resultant mixture thus transported by the matrix to a point of discharge while coalescence is occurring is thereby conditioned for separation of the coalesced first liquid from the second liquid by other physical processes and apparatus known in the art.

Environmental protection efforts in recent years have yielded various proposals for separating oil from water. Most techniques operated on the assumption that the oil is already stratified, i.e., either floating as a layer on the water or existing in sizable globules readily settled out of suspension or readily contacted by filter element surfaces. Most of the floating oil existing in that condition can be recovered by any of different techniques including skimming, decanting, contact filtration or contact absorption.

In many situations, however, oil pollution of water exists wherein the oil is dispersed in droplets of such minute size that bulk or stratified oil separation techniques are ineffective. Typical of these are waste or by-product water discharged from manufacturing facilities such as oil refineries, oil/water mixtures pumped centrifugally against substantial heads and resulting in oil dispersion, engine cooling water discharge, industrial or commercial establishment run-off water where oil is present, ships bilge water and ships ballast water. Under the increasingly rigid anti-pollution policies of industry and government, even the slightest traces of oil are objectionable; for example, as little as 10 parts per million of oil in water. This is true not only with oil spills on open bodies of water but often in fixed installations wherein large volumes of water containing small traces of oil must be purified economically. Chemical treatment to precipitate the oil or to convert it into an acceptable material is usually not economical. Flow-through filters act too slowly and are not effective to coalesce minute oil particles.

For example, in seemingly quiescent settling ponds or tanks, naturally occurring thermal convection or other disturbances, however, small, tend to keep the particles or droplets continuously in motion. Those that settle to the surface of the water are extremely slow to coalesce. The relatively very high surface tension acting upon such small oil droplets tends to keep the droplets apart and thwarts coalescence.

Flow-through filter type coalescers are also of limited effectiveness. The light, minute oil droplets are extremely "motile" i.e., motion-reactive to the slightest pressure gradients in the surrounding water and thereby avoid contact with surfaces. Viscous boundary layer forces attending flow, however slow, along the filter matrix surfaces tend to keep the oil droplets away from the surfaces owing to velocity gradients and attendant pressure gradients. Further, matrix surface irregularities causing adjacent flow path curvature force the lighter oil droplets away from the intended coalescing surfaces through centrifugal force effects. Since these are both velocity-dependent effects, attempts to increase mixture processing rates in conventional flow-through coalescing filters are counter-productive. Capacity increase effected through increased filter element cross-sectional dimensioning, or by adding banks of filters, adds undesirably to the bulk and cost of the apparatus as a whole. Flow-through filters with matrix channels smaller than oil droplets diameter can effectively coalesce oil, but tend to plug up so as to require frequent cleaning or replacement of filter elements.

A further object herein is to overcome the problems described, and to devise a coalescer process utilizing an apparatus which is essentially self-reconditioning, continuously and reliably operable unattended substantially over long time periods, and relatively non-critical in terms of operating capability as affected by particle size or mixture proportions.

A further object hereof is to achieve the stated objectives with process concepts that offer versatility in selecting the overall physical size and shape of equipment to suit varying installation and operation requirements. Thus scaling up or scaling down the size to vary the volumetric capacity proportionately may be done without adversely affecting operating efficiency or effectiveness.

BRIEF DESCRIPTION OF INVENTION

As a process, the present invention, applied illustratively to coalescing minute droplets of oil dispersed in water, comprises the steps of first ingesting the mixture liquids into an oleophilic three-dimensioned network or matrix preferably having small open cells or pores predominantly of approximately the same size, secondly holding the ingested mixture in the matrix pore spaces under quiescent (i.e., substantially motionless) conditions for a time period which allows gravity settling of the oil droplets onto the pore surfaces where they will coalesce together with the aid of the oleophilic properties of those surfaces, transporting the ingested mixture to a discharge point preferably during the holding period just described, and finally purging the matrix of the water and coalesced oil at such discharge point.

In the preferred and illustrated embodiment the matrix, formed as an endless belt moved circuitously, ingests mixture to be processed in passing through a body thereof, holds such mixture through an interval during which quiescent settling conditions are maintained in the matrix pores, transports the liquid away from the body of mixture to a discharge point, and finally is purged of the liquid at such point. Preferably the matrix belt or band is of a resiliently compressible open-pore polymeric or similar "foam" material. Purging it of liquids is accomplished by squeezing. Reexpansion of the matrix as it reenters the body of mixture causes it to ingest more mixture to start another operating cycle. As a pump the coalescer matrix moves large amounts of liquids while coalescence occurs, whereas in flow-through coalescence filters the liquids can be moved only extremely slowly.

As a further feature, the belt is shielded from external disturbances during its holding run by a shielding cover. By moving the band in a horizontal plane hydraulic level remains substantially constant throughout the holding interval, i.e., the matrix remains effectively immersed during its travel, even though the ingestion and discharge chambers are effectively sealed by the belt and associated elements. There is thus no tendency for the quiescently held liquids to drain out of the matrix during the transport-holding interval, impairing the settling action.

While there may be slight circulatory motion within each individual pore space due to the changing orientation of the pore walls as the matrix moves in its orbital path of circulation, such motion is so very slight and occurs in a plane at right angles to the direction of settling that it does not impair settling rates or efficiency and thereby can be ignored as negligible under intended operating conditions as herein described.

Preferably the matrix is mounted as a jacket surrounding an upright rotary cylindrical support. The support comprises part of the enclosure means and provides a backing surface against which the jacketing matrix is compressed by compression means such as an upright roller that accomplishes purging of the matrix at the end of the coalescence interval, and preparation of the matrix for reingestion of mixture liquids by expansion as it reenters the original body of mixture, and also serves as part of a sealing barrier separating the enclosure compartments from each other which contain the first and second bodies of mixture.

These and other features, objects and advantages of the invention will become more fully evident from the following description thereof by reference to the accompanying drawings.

DESCRIPTION OF DRAWINGS

FIG. 6 is an isometric view of the coalescer matrix band and support drum removed from the unit and partially sectioned to reveal structural details.

FIG. 7 is an oil droplet settling velocity graph.

FIG. 8 is a settling (coalescence) time graph.

DETAILED DESCRIPTION OF INVENTION

Figure 1:
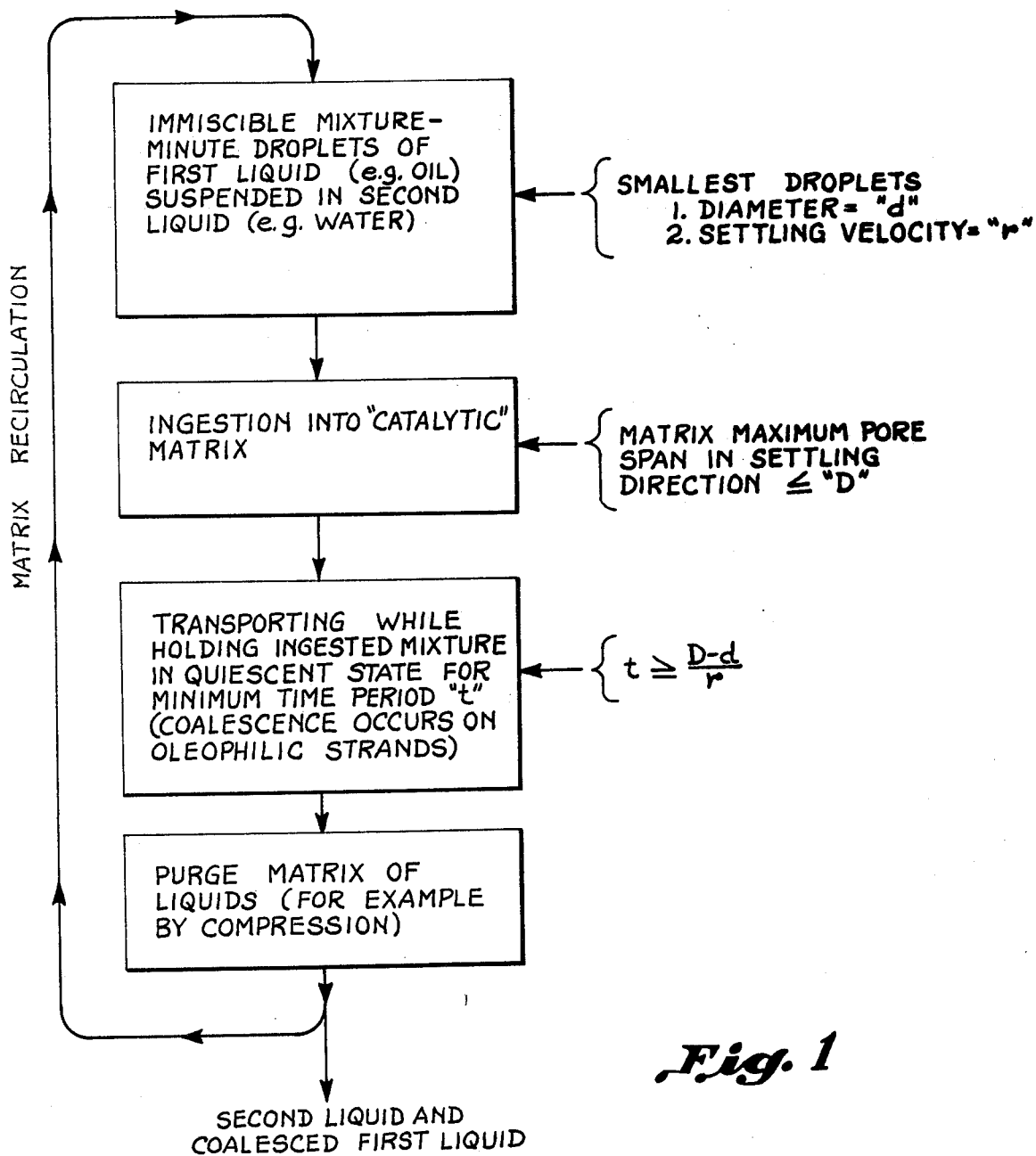
FIG. 1 is a process diagram of the invention.

In the schematic diagram of FIG. 1 the main process steps are illustrated in sequence together with the relationship between smallest size droplet diameter, settling motion velocity, maximum pore span dimension and minimum settling time attainable under idealized conditions. In FIG. 7 the graph illustrates droplet velocity (in settling motion under gravity conditions) as a function of droplet radius. In FIG. 8, settling time of different size droplets in reticular foam matrixes of different pore diameters is illustrated assuming a fully reticulated foam matrix and matrix pores of substantially uniform size in the matrix. Comparison of the numerical values in FIGS. 7 and 8 will show that actual settling time takes into account the necessity of the average droplet to move through a distance of more than one pore diameter before it contracts and settles upon a pore strand, this being due to the openness factor of a fully reticulated foam matrix or network used as the settling medium.

The conditions for settling and thereby coalescence on the matrix surfaces of the droplets of a first liquid such as oil ingested with a suspending liquid such as water may be expressed mathematically. Let it be assumed that the droplet diameters are not less than d and the strands or elements in the matrix forming the pores or voids are predominantly of a span dimension not greater than D in the direction of settling motion of the droplets (i.e. vertical, with gravity settling). With the mixture held in a quiescent state and subject to a settling force (i.e. the force of gravity) producing a settling motion velocity r of the droplets, those droplets including the ones having the greatest distance to travel in order to cross one pore span distance will reach and coalesce upon the opposing pore surface if in the path of such droplets in a time $t$ as follows: $t \leqq (D-d/r)$.

Thus, if the mixture is so held in such a matrix for at least a time t computed as above, all droplets within each pore that are to coalesce in travelling across the pore span will have coalesced and squeezing of the matrix will express the coalesced liquid along with the suspending liquid and any residual uncoalesced droplets. However, as explained above, commercially available reticulated foams are so open internally that all droplets do not encounter pore surfaces in travelling the distance $D-d$. Some of these droplets and others as well may move past those surfaces into the next adjoining pore space and perhaps beyond before encountering and coalescing upon a matrix element surface. Thus, it is desirable, in order to effect substantially complete coalescence of the droplets in such foam matrices to employ a holding time t that is not less than and preferably is greater than the quantity $(D-d/r)$ (i.e. a few times $(D-d/r)$.

Figure 2:
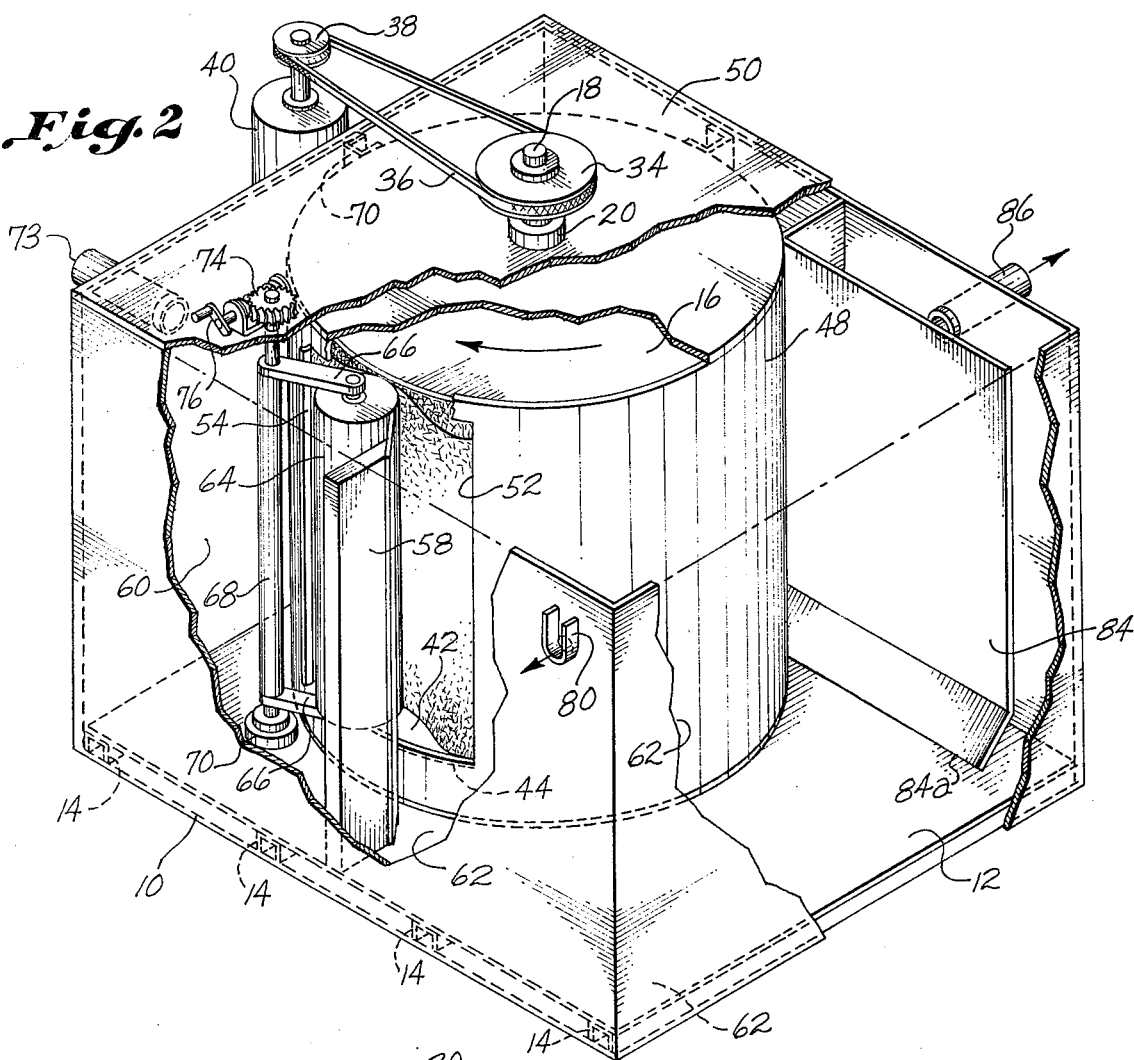
FIG. 2 is an isometric view.

In FIG. 2 et seq the coalescer comprises an outer tank or container 10 of cubical shape. The tank bottom 12 is reinforced by stiffener channels 14. A hollow circular cylindrical drum 16 is mounted within the tank on a support shaft 18 maintained in vertical position by upper and lower end mounting journals 20 and 22 so as to be rotatable about a vertical axis. The rotary drum 16 is sealed by top and bottom walls 24 and 26 and reinforcing intermediate partitions 28. Encircling the drum from top to bottom is a polyvinylchloride jacket 30 bonded to the drum's exterior surface. Surrounding the PVC jacket is a polyurethane reticulated foam sleeve or jacekt 32 in turn bonded to the PVC. The jacketing band 32 serves as the coalescer matrix according to the invention. The upper end of the drum shaft 18 fixedly supports a drive sheave 34 which is driven by a belt 36 engaging a pulley 38 driven by a motor unit 40.

Typically with polyurethane reticulated foam material in lthe matrix of the order of 60 to 100 pores per inch the motor drive unit will be operated to turn the drum at a speed of up to approximately four revolutions per minute, which affords a settling interval of about fifteen seconds or longer.

Figure 3:
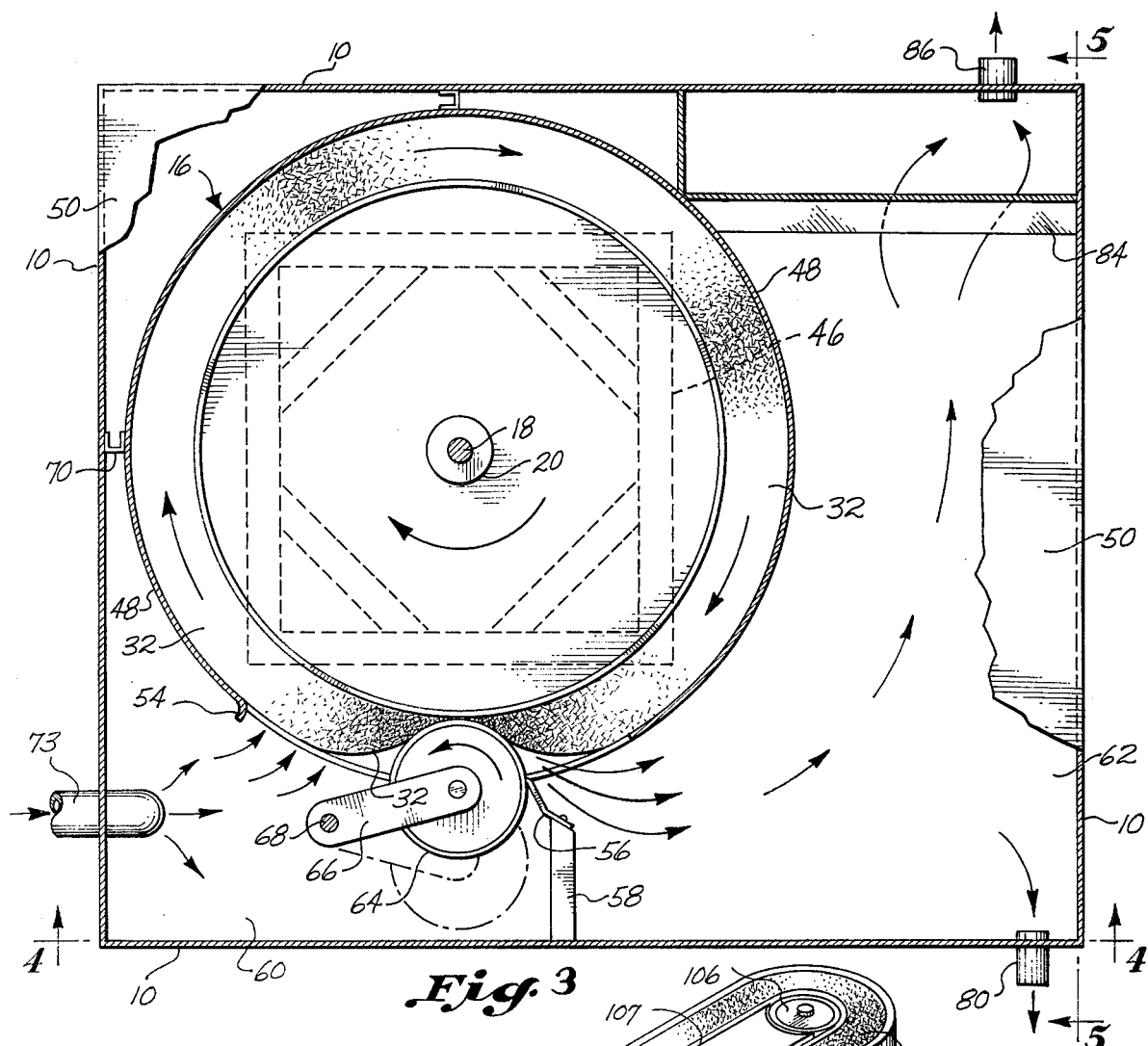
FIG. 3 is a plan view.

The lower edge of drum 16 moves in sliding substantially sealed contact with a shoe or sheet of polyvinyl chloride 42 supported on a platform plate 44 elevated about the tank bottom upon a supporting frame 46 (FIG. 3). The lower drum shaft journal 22 is mounted within this base frame 46. Plate 44 is circular in form and comprises the supportive base of a circular cylindrical shield 48 extending between the tank bottom 12 and the tank top 50. The matrix 32 is fitted to be slidably received within the sleeve, such that the resiliently compressible polyurethane foam matrix is in slight compression from the shield throughout. The shield 48 is open circumferentially to the extent of about 60 degrees of arc starting from the vertical edge 52 and extending to the outturned vertical edge 54. Intermediate the edges 52 and 54 is located a squeeze roller 64 engaged by a sealing, scraper blade 56 mounted on a partition 58 extending vertically from top to bottom of the tank and projecting laterally inward from the adjacent side wall of the tank. In cooperation with other elements to be described the partition 58 and blade 56 engaging the squeeze roller divide the adjacent region of the tank into a mixture receiving compartment 60 and a mixture discharge compartment 62.

Squeeze roller 64 is mounted at top and bottom on swinging arms 66 so as to turn freely on a vertical axis at the ends of such arms. The base ends of the arms are fixed on an upright shaft 68 carried in bottom and top journals 70 and 72. A worm and wheel drive 74 operated by a hand crank 76 (or power driven unit if desired) can be turned so as to move the squeeze roller 64 toward and from the adjacent side of the drum matrix sleeve 32, between the solid-line and broken-line positions of the roller shown in FIG. 3. In its broken-line position the retracted squeeze roller 64 is out of contact with the coalescer matrix band 32 whereas in its solid-line position the squeeze roller has compressed the band 32 firmly against the opposing solid wall of the matrix carrier drum 16 as shown. In the roller's latter position the wiper or scraper 56 presses against the PVC coated surface of the roller and forms a fluid-tight seal against that surface extending between the bottom wall sheet 42 and top of the container.

The remaining closure elements sealing off the receiving chamber 60 so that unprocessed mixture liquids may not seep into the discharge chamber 62 include the squeeze roller itself, the matrix band 32 compressed against the drum 16 by the roller, the sealing frictional contact interface between the shield 48 adjacent to and extending circumferentially from the shield's entrance edge 54, and the frame channel 70 which supports the shield 48 and spans between the shield and the adjacent container side wall as shown. An infeed pipe 73 delivers mixture into the receiving compartment 60 for processing in the coalescer.

With the drum rotated in the direction of the arrow shown in FIG. 3 by power unit 40, and with the squeeze roller 64 positioned in its solid position shown in the same figure, the resiliently compressible polyurethane matrix band 32 progressively reexpands upon entering the receiving chamber 60 and advancing toward the shield entrance (at 54), and it thereby ingests mixture liquids into its pores. By the time any given portion of the matrix previously compressed reaches the entrance edge 54 of shield 48 it is fully expanded and is full of mixture liquids. Matrix liquids thus ingested are held in the small matrix cells or pores under quiescent conditions as the matrix continues to advance in its travel within the shield 48. Under these conditions, when held constant for a sufficient time interval, opportunity is afforded for the minute droplets of oil or other liquid particles suspended in the initial mixture to settle out upon the matrix strands or pore surfaces and thereby coalesce. When the band has completed its circuit within the shield 48 and returned to the squeeze roller 64 compression of the matrix by the latter expels the mixture liquids into the discharge compartment 62 through the gap in the shield between edge 52 and the roller 64. Such compression of the matrix band thus serves the dual function of purging the matrix of liquids and simultaneously conditioning it for the ingestion and processing of additional liquids as it thereupon reenters the receiving chamber 60.

In the case of oil-water separation systems wherein the present invention is utilized to coalesce minute oil droplets into a stratified or bulk condition suitable for separation by other means, the mixture liquids discharged into chamber 62 will comprise the same water and oil as contained in the initial mixture. But at this stage the oil will be discharged coalesced into large globules or droplets that will rise rapidly to the surface of the body of water in the chamber 62. While the surfacing oil may be removed by any suitable means, in the example shown, when the level of this stratified oil rises to a certain height in chamber 62 it will decant out through the discharge pipe 80. Water collecting in the discharge chamber 62 passes beneath the lower edge 84a of a septum 84 extending across the end of chamber 62 opposite the squeeze roller, and flows through the outlet 86 when operating level is reached and maintained during normal operation of the system. If separation of the coalesced oil and water is to occur in chamber 62 the size and dimensioning of chamber 62 should be such as to allow surfacing and stratification of the coalesced oil to occur fully before the water reaches the outflow pipe 86. With a small size chamber special baffling or other arrangements to minimize eddying effects may be desirable to facilitate this separation. Alternatively the mixture as a whole may be removed directly and the two liquids separated externally; or other specialized separator devices may be operated in the chamber or in physical association with it.

In operation, rotation of the drum 16 carrying the coalescer matrix 32 is effected at such a speed, usually the maximum permissible, as to allow settling and coalescence of the oil particles on the matrix strands in the rotation cycle. With practical dimensioning of the matrix as to diameter, thickness and height it will be appreciated that relatively large quantities of mixture liquid can thus be processed over a given period of time, the matrix acting essentially as a pump having a volumetric capacity proportional to matrix volume and matrix rotational speed. Matrix volume for this purpose represents nearly the full geometric volume of the matrix body because the solid material making up the strands and interconnecting nodes comprises on the order of five percent of the matrix volume in a fully reticulated polyurethane foam body. Pumping of mixture liquids by the rotating matrix band results in hydraulic head or liquid level in the discharge compartment 62 slightly higher than that in the receiving compartment 60. The inlet and outlet levels in the tank compartments are placed accordingly. Moreover, it will be evident that the apparatus may be provided with suitable float switches, controls and alarms to assure maintaining desired operating levels, and that various external or remote control systems for adjusting and regulating operation of the apparatus can also be furnished. The device is essentially self-conditioning and over long operating periods requires little or no operator attention. The resiliently compressible matrix of expanded polyurethane reticular foam is itself durable and even in small pore sizes does not tend to plug up or foul with oil residues or foreign matter. In that regard the aspirating technique of ingesting and expelling oil and water provides a self-cleaning effect due to the injection occurring through one face of the matrix and expulsion of the oil and water, together with any associated sediment, out of the same face.

Because the open-pore matrix extends between receiving and discharge compartments below the liquid levels therein, the matrix remains essentially immersed through its rotation cycle. It is therefore in hydraulic pressure communication with the body of liquids in the two compartments 60 and 62 throughout its transit around the drum path, so that mixture in the matrix pores undergoes only the slightest change of hydraulic head during the holding or transport interval when coalescence occurs. Accordingly, hydraulic head changes do not occur which otherwise could result in flow and thus present a disturbance in the quiescent state of the mixture liquids during settling.

Compression of the matrix band 32 between the squeeze roller 60 and the drum wall 16, as shown in FIG. 3, expresses first the water and then, as the more tenaciously held oil is squeezed between the strands, forces out the oil. Nevertheless, a slight coating of oil is left on the matrix strands priming them as desired for maximum attractability to oil particles on the subsequent cycle. A liner (not shown) of polyvinylchloride or other suitable material on the inside wall of the shield 48 also becomes primed with oil and helps in turn to keep the matrix outer wall surfaces primed, as does a polyvinylchloride layer on the exterior of the squeeze roll 64.

Figure 9:
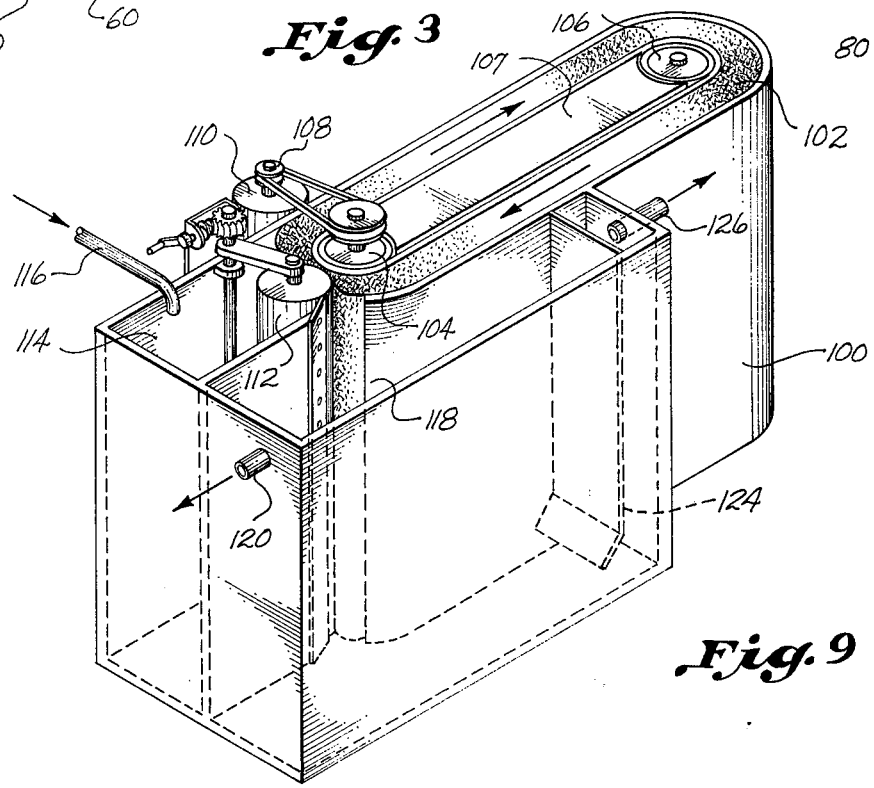
FIG. 9 is an isometric view of a modified coalescer employing principles of the first described embodiment in a unit of different configuration.
Figure 4:
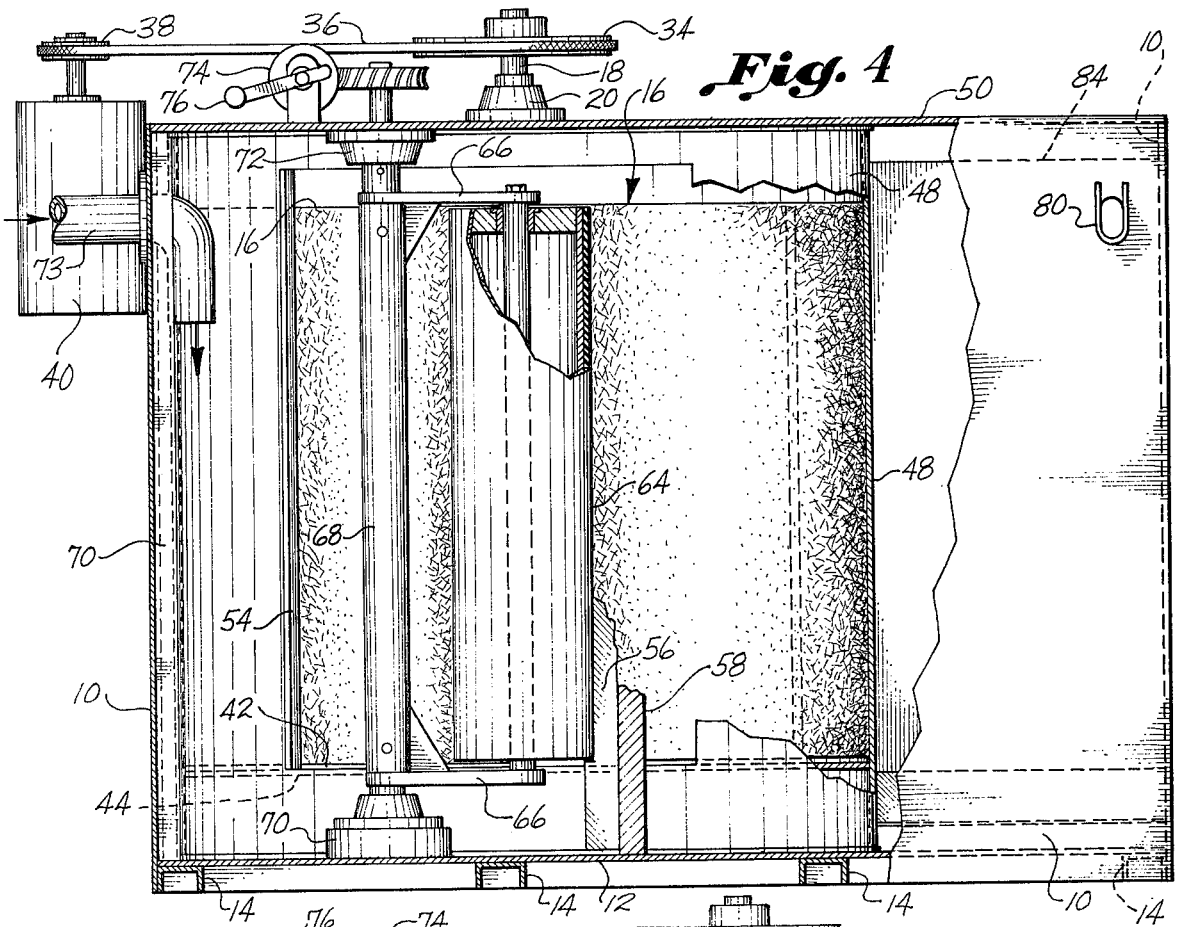
FIGS. 4 and 5 are elevation views from different sides showing the improved coalescer in one form, with parts broken away to reveal certain details.
Figure 5:
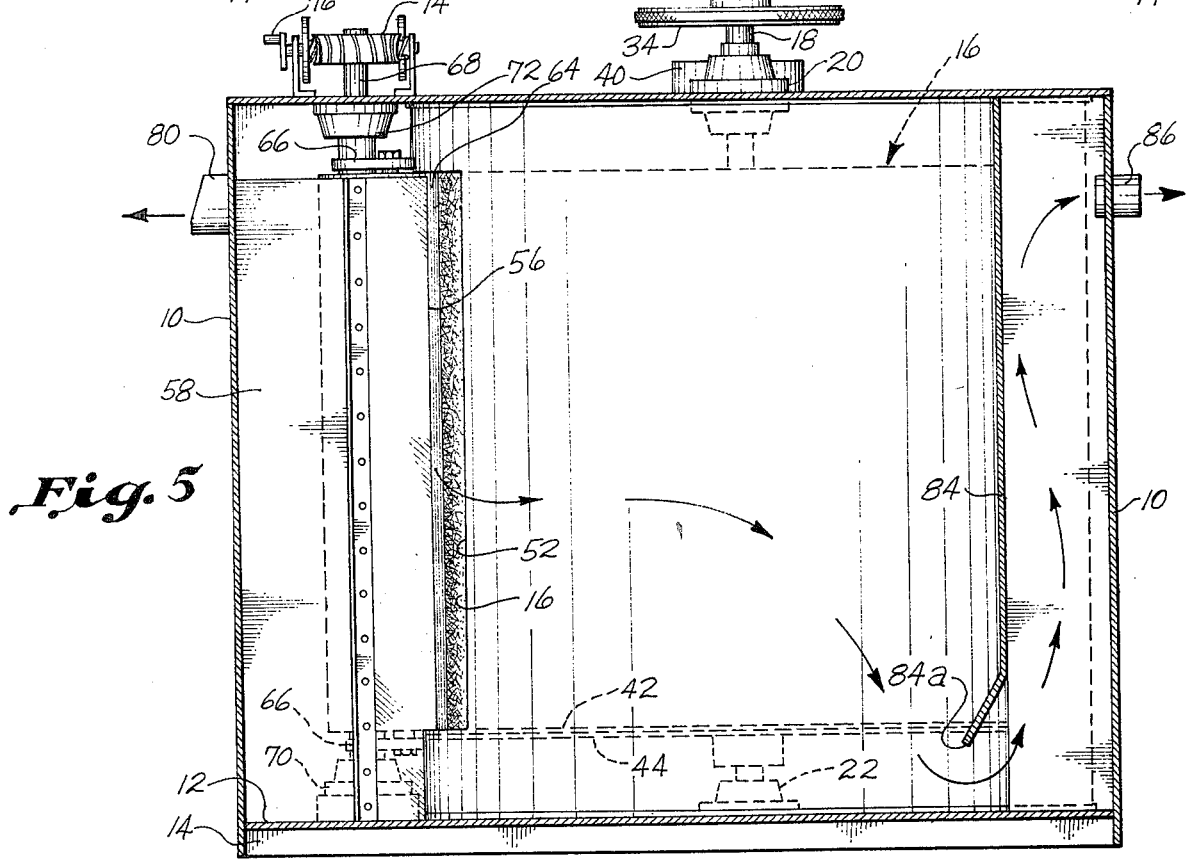

In the embodiment shown in FIG. 9 the container 100 is of elongated proportions in plan, and the matrix 102 is in the form of an endless belt encircling a driven roller 104 and opposing idler roller 106. An internal shield body 107 occupying the space surrounded by the belt 102 and rollers 104 and 106 presses the belt with slight pressure against the outer tank walls to effect a seal therewith as did the shield in the preceding embodiment.

The roller 104 drives the matrix belt 102. This roller in turn is driven by a belt and pulley drive 108 and a motor unit 110. Squeeze roller 112 is pressed against the matrix to squeeze it against the roller 104. Squeeze roller position is established by a worm and wheel actuator 112 as in the previous embodiment. Mixture liquids are fed into a receiving compartment 114 through an inlet pipe 116. Mixture liquids expelled or purged from the matrix belt 102 by roller 112 are discharged into a discharge chamber 118 as in the previous embodiment, and the floating stratified oil is tapped off by an outlet 120 whereas the water, after passing through screening partitions 122, and beneath the lower edge of a septum 124, flows out through the pipe 126 as before. A coalescer in this elongated, narrow configuration can be placed in spaces, such as in bilge spaces of ships not readily suited to a more cubically shaped coalescer of equal capacity.

Suitable matrix materials that can be produced in reticulated foams and which are both oleophilic and hydrophobic, include a number of the synthetic polymers such as polyurethane, polypropylene, polystyrene and polyvinylchloride. As previously indicated, priming of the surfaces within these foams by wetting with oil enhances their oleophilic, hydrophobic properties as desired.

From the foregoing, and by way of general summary, it will be appreciated that gravitational settling may be effected whether the suspended droplet liquid has greater or lower specific gravity than the suspension medium liquid, in one case the droplets rising and in the other case descending into contact with the matrix or network elements. Droplet size and specific gravity, and the viscosity, specific gravity and temperature of the suspension liquid affect settling velocity. The actual rate of coalescence in the matrix is a function of settling velocity, liquid surface tensions, wetting characteristics of the matrix pore surfaces, and matrix pore openness, i.e., average ratio of open area through which rising droplets may pass at the interfaces between adjacent pores to the solid area occupied by the strands and nodes making up the interfaces. Here a compromise is involved because openness is a function of the ratio of void region volume to solid region volume within the matrix, and also determines volumetric holding capacity of the matrix. Hence, openness within the pore labyrinth increases volumetric holding capacity but decreases settling rate and to some extent attainable degree of quiescence through full isolation of the minute pockets of the held mixture. Ideally, total isolation of these small quantities of mixture held within the respective individual pore spaces is desirable for most efficient settling of the minute particles of oil or other liquids to be settled out of a mixture. In practice, however, it is found that a fully reticulated polyurethane foam provides a good compromise achieving practical settling rates, effective total settling and high volumetric capacity within the matrix body.

With the improved and novel coalescing system of this invention, oil droplets which are so small and have such high motility and surface tension as to avoid coalescence using former techniques will coalesce readily on the matrix surfaces herein due to the effective "catalytic" or coalescence-promoting properties of those surfaces. Each droplet, enabled by the smallness of the pore spaces to contact such a surface within a reasonable short time period, tends to be absorbed on and thus spread out along that surface and thus become joined with other droplets similarly affected. The process continues during the quiescent holding interval in the matrix until accumulation of coalesced droplets or globules of oil occur on the strands and their connecting nodes. When the matrix is compressed to a greatly reduced volume, first the water and later the more tenaciously held oil is forced out of the voids. As previously stated, this leaves the matrix strands and nodes wetted slightly with a film of oil, primed for a subsequent cycle of operation.

The present invention applies primarily to coalescence of oil or other liquid droplets ranging in size from about 5 microns to about 100 microns radius. It will be appreciated that oil in droplets of larger size, and even globules or layers of oil dumped into the receiving compartment in the coalescer will also be ingested into the matrix and eventually purged with mixture water into the receiving compartment together with oil that is coalesced therewith from minute droplets also contained in the initial mixture. The system is thus not critical in terms of the condition of the oil in the mixture processed thereby, since it will coalesce the minute suspended particles of concern even when occurring in the presence of large globules. In order to effectively and efficiently process the mixture as desired, the matrix pores should be in the size range of from about 100 pores per inch as a minimum size to about ten pores per inch as a maximum. Preferably the pores are of about the same size throughout the matrix in order to maximize production rate capacity of the system.

It has been stated that quiescent conditions within the matrix pores are maintained during the holding interval while the ingested mixture is being transported from the point of ingestion to the point of discharge. This condition is achieved by the small size and isolating effect of the matrix pores, the retention of substantially constant hydraulic heat throughout the transport interval during which the matrix is effectively "immersed" in the mixture medium, and preferably the protective presence of the surrounding shield 48 isolating the rotating matrix from the effects of external disturbances or temperature gradients. Such quiescent holding conditions and the smallness of the holding pores providing a short settling distance for the particles to negotiate in a brief holding interval, assures substantially complete settling and coalescence of oil particles in a short time, so much so that discharge water can be produced at high "pumping" rates and will be essentially pure or free of particulate oil, i.e., for example, containing as little as five parts per million of oil remaining uncoalesced from an original mixture of five hundred parts per million.

Moreover, it will be evident that different shapes and sizes of coalescers practicing the invention are readily attainable by design to suit different applications. Scaling up or scaling down the apparatus does not adversely affect the operating performance thereof to any material degree because the factors producing efficient coalescence are essentially independent of size. For example, large coalescers having a thick and wide matrix band or belt having proportionately larger cross-sectional area, hence volume per unit of length, are capable of processing at high "pumping" rates for a given travel velocity of the band or belt. By lengthening the belt or band and thereby the physical distance of travel between point of ingestion and point of discharge of mixture liquids in a design, it is also possible to increase volumetric processing rate directly, because the belt or band may be moved faster in a lineal sense without reducing the total cyclic holding interval during which coalescence is allowed to occur within the matrix.

These and other features, aspects and embodiments of the invention will be evident to those skilled in the art based upon an understanding of the foregoing disclosure of the presently preferred embodiment thereof.

What is claimed is:

1. The process of coalescing minute droplets of a first liquid of a diameter substantially not less than "$d$" suspended in an immiscible mixture thereof with a second liquid of different specific gravity comprising ingesting the mixture into the voids of a porous three-dimensional matrix comprising elements the surfaces of which are preferentially attractive to the first liquid and which elements are interconnected to form a labyrinth of voids predominantly of a span substantially not greater than "$D$" in the direction of settling of said droplets, such ingestion being effected by expansion of the matrix from a compressed state while immersed in a body of the mixture, holding the ingested mixture in said matrix under conditions preventing drainage from or flow through the matrix for a time period substantially not less than "$t$" while the matrix is maintained in substantially constant orientation relative to the direction of the force of gravity so as to effect motion of the droplets toward said elements at a settling velocity "$r$", wherein substantially $t \geq D-d/r$, whereby said droplets settle and coalesce together on said elements, and purging the matrix substantially of the coalesced first liquid and the second liquid.

2. The process defined in claim 1 wherein the purging is effected by recompressing the matrix.

3. The process defined in claim 2 wherein the matrix comprises an endless band continuously recirculated through the mixture in a substantially horizontal path, and the recompression of each successive portion of the matrix provides the compressed state from which the matrix expands as it re-enters the mixture to reingest mixture liquids.

4. The process defined in claim 3 wherein the matrix band is elongated in cross-section and is circulated with its wide dimension disposed substantially vertical.

5. The process defined in claim 4 wherein the purged liquids are collected in a space effectively sealed from the mixture by the compressed matrix and elements effecting the compression thereof.

6. The process defined in claim 1 wherein the matrix band is elongated in cross-section and is circulated in a substantially horizontal path with its wide dimension disposed substantially vertical.

7. The process defined in claim 6 wherein the purging is effected by recompressing the matrix.

8. The process of clarifying water polluted by unstratified, uncoalesced minute oil droplets, comprising ingesting the oil/water mixture into a resiliently compressible porous matrix of oleophilic, hydrophobic material by allowing expansion of the matrix from its compressed state while submerged in the mixture, holding the mixture in the matrix with the matrix remaining submerged under quiescent conditions maintained within the matrix until substantially all of the oil droplets have settled by gravity and coalesced together upon internal pore surfaces in the matrix, thereupon compressing the matrix to express the water and coalesced oil from the matrix into a separate body of water accumulated by expression from the matrix and containing coalesced oil expressed from the matrix and allowed to collect on the surface of said body of water, and thereafter separating the collected oil from the body of water.

9. The process of coalescing minute particles of a first liquid out of an immiscible mixture thereof with a second liquid of different specific gravity, comprising causing the mixture to enter the pores of a body of open porous material, the internal pore-defining surfaces of which are attractive to the first liquid in preference to the second liquid, thereupon maintaining the body submerged in mixture liquid under substantially total quiescence imposing substantially zero flow-producing hydraulic pressure gradients upon liquid contained in the individual pores and thereby maintaining conditions of substantially zero flow within the pores for a predetermined time period conducive to gravity settling and resultant coalescence of said minute particles upon said internal surfaces, and discharging the liquids from the pores of said body after said time period, said process being further characterized in that the porous body comprises a resiliently compressible open-pore foam repeatedly compressed to discharge liquids from the pores and thereafter permitted to expand from a compressed state while submerged in the mixture so as to cause mixture liquids to enter the pores.

10. The process of claim 9 wherein the first liquid is emulsified oil, and the second liquid is water.

* * * * *